US009424133B2

(12) United States Patent
Schindler (10) Patent No.: US 9,424,133 B2
(45) Date of Patent: Aug. 23, 2016

(54) PROVIDING AN EVENTUALLY-CONSISTENT SNAPSHOT OF NODES IN A STORAGE NETWORK

(71) Applicant: NetApp, Inc., Sunnyvale, CA (US)

(72) Inventor: Jiri Schindler, Jamaica Plain, MA (US)

(73) Assignee: NETAPP, INC., Sunnyvale, CA (US)

( * ) Notice: Subject to any disclaimer, the term of this patent is extended or adjusted under 35 U.S.C. 154(b) by 309 days.

(21) Appl. No.: 13/938,693

(22) Filed: Jul. 10, 2013

(65) Prior Publication Data

US 2015/0019493 A1 Jan. 15, 2015

(51) Int. Cl.
*G06F 17/30* (2006.01)
*G06F 11/14* (2006.01)
*G06F 3/06* (2006.01)

(52) U.S. Cl.
CPC ............ *G06F 11/1402* (2013.01); *G06F 3/067* (2013.01); *G06F 3/0653* (2013.01); *G06F 11/1466* (2013.01); *G06F 2201/84* (2013.01)

(58) Field of Classification Search
CPC ... G06F 3/0653; G06F 3/067; G06F 11/1412; G06F 11/1466; G06F 2201/84
See application file for complete search history.

(56) References Cited

U.S. PATENT DOCUMENTS

| 6,799,189 B2* | 9/2004 | Huxoll ................ G06F 11/1471 707/999.204 |
| 7,707,165 B1* | 4/2010 | Jiang et al. .................... 707/806 |
| 9,053,167 B1* | 6/2015 | Swift et al. |
| 2005/0278382 A1* | 12/2005 | LaRocca et al. .............. 707/200 |
| 2006/0080362 A1 | 4/2006 | Wagner et al. |
| 2007/0185915 A1* | 8/2007 | Prahlad et al. ................ 707/200 |
| 2008/0275925 A1* | 11/2008 | Kimmel ........................ 707/204 |
| 2010/0179941 A1* | 7/2010 | Agrawal et al. ............... 707/624 |
| 2012/0265742 A1* | 10/2012 | Burckhardt et al. .......... 707/694 |
| 2013/0339302 A1* | 12/2013 | Zhang et al. .................. 707/649 |

OTHER PUBLICATIONS

Stender, Jan, "Snapshots in Large-Scale Distributed File Systems", Jan. 4, 2013, Dissertation at Humboldt University of Berlin, 139 pages.*
International Search Report on corresponding PCT application (PCT/US2014/046206) from International Searching Authority (EPO) dated Oct. 6, 2014.
Written Opinion on corresponding PCT application (PCT/US2014/046206) from International Searching Authority (EPO) dated Oct. 6, 2014.

* cited by examiner

*Primary Examiner* — Scott A Waldron
(74) *Attorney, Agent, or Firm* — Klein, O'Neill & Singh, LLP (57) ABSTRACT

Systems and methods which provide for obtaining snapshots of one or more nodes, while having minimal impact on performance and throughput of the storage network are provided. Embodiments may involve a method of obtaining snapshots of individual node data within a clustered storage network having a plurality of nodes without requiring quiescing of every node. The snapshots may be obtained in a rolling fashion, e.g., moving across the individual nodes of a cluster either sequentially or non-sequentially. In other embodiments snapshots may be obtained in an asynchronous manner. The obtained snapshots then collectively define an eventually consistent view of the entire system. Such a view may be utilized to provide for mirroring functionality, e.g. to provide for DR and/or HA capabilities.

22 Claims, 4 Drawing Sheets

PROVIDING AN EVENTUALLY-CONSISTENT SNAPSHOT OF NODES IN A STORAGE NETWORK

TECHNICAL FIELD

The present application relates generally to storage networks and, more particularly, to obtaining snapshots of one or more of plurality of nodes in a storage network without disturbing other nodes in the cluster.

BACKGROUND

The creation and storage of digitized data has proliferated in recent years. Accordingly, techniques and mechanisms that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes.

Digital data stored by data storage systems may be frequently migrated within the data storage system and/or between data storage systems during normal operation. For example, when one or more users desire to access or download files, a portion or even the entire contents of a data volume may be sent across the network to be accessed by the user. Such communications may take place between multiple nodes of the storage network, between a storage array and one or more nodes, between other communication devices on the network (e.g. switches and relays), etc. Additionally, data within the data storage system may be mirrored to other locations such as for disaster-recovery (DR) and/or high-availability (HA) data operations.

Issues arise in storage networks when mirroring data because compiling data from multiple locations, e.g. among multiple nodes in a cluster of a storage network, for later replication at another location, such as at a DR site, creates inefficiencies within the storage network. For example, in present systems, replicating data from a cluster of nodes requires the system to quiesce each of the nodes in order to establish a snapshot of the cluster which may then be utilized to create/update a DR storage resource.

In other words, in present systems, each of the nodes of a cluster in a storage network must temporarily suspend its operation in order to provide for a synchronized snapshot of the whole cluster of nodes for DR or other replication purposes. While the nodes are suspended, they are also temporarily unavailable to clients which are attempting to store/retrieve data from the storage network. This causes undesirable inefficiencies within the storage network, which may eventually effect the overall performance of the network and potentially frustrate the end user.

BRIEF DESCRIPTION OF THE DRAWINGS

For a more complete understanding, reference is now made to the following descriptions taken in conjunction with the accompanying drawings, in which.

DETAILED DESCRIPTION

The present application provides for systems and methods which provide for obtaining snapshots of one or more nodes, while having minimal impact on performance and throughput of the storage network. Embodiments may involve a method of obtaining snapshots of individual node data within a clustered storage network having a plurality of nodes without requiring quiescing or disturbing the operation of every node. The snapshots may be obtained in a rolling fashion, e.g., moving across the individual nodes of a cluster either sequentially or non-sequentially. In other embodiments snapshots may be obtained in an asynchronous manner. The obtained snapshots then collectively define an eventually consistent view of the entire system. Such a view is eventually consistent because of the time delay to collect snapshot data from each node of a cluster to provide an overall snapshot of a cluster. The eventually consistent view may be utilized to provide for mirroring functionality, e.g. to provide for DR and/or HA capabilities.

In one example embodiment, a consistent view of an NoSQL database system may be obtained in a manner that does not impede the performance (such as throughput) transactions in the system. This view may be obtained by moving across the individual constituent pieces, e.g. nodes in a cluster, of the database system and then taking individual snapshots and collectively defining a consistent view of the entire system that is built out of the individual snapshots of the individual nodes to create the consistent view. Such a system may allow for recoverability of data in the event of a malfunction in one or more nodes, and may function in a way that does not impede or halt the execution of the entire system.

Snapshots taken for one or more nodes may be implemented using multiple methods. For example, in one embodiment, a snapshot of a given node is scheduled locally within the node independent of any external coordination from a management system. In another embodiment, a snapshot of a given node is scheduled by an outside management system. Additionally, embodiments may provide for snapshots to be obtained at different times.

In some embodiments, snapshots are first stored locally and then provided to a storage cluster. Each snapshot may correspond to an individual volume of the storage cluster. The individual volumes are then compiled to collectively form an eventually consistent state of the overall cluster of nodes within the storage network. This may then be provided to a disaster recovery backup site.

In the event of a disaster, such as the failure of one or more nodes, the state reflected by the compiled snapshot data may be used to recover the system to its previous consistent state. One embodiment may provide for node local recovery based on individual volumes. Another embodiment may include cluster wide recovery based on the entire eventually consistent state, or a combination therein.

The foregoing has outlined rather broadly the features and technical advantages of the exemplary embodiment in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the invention.

Figure 1:
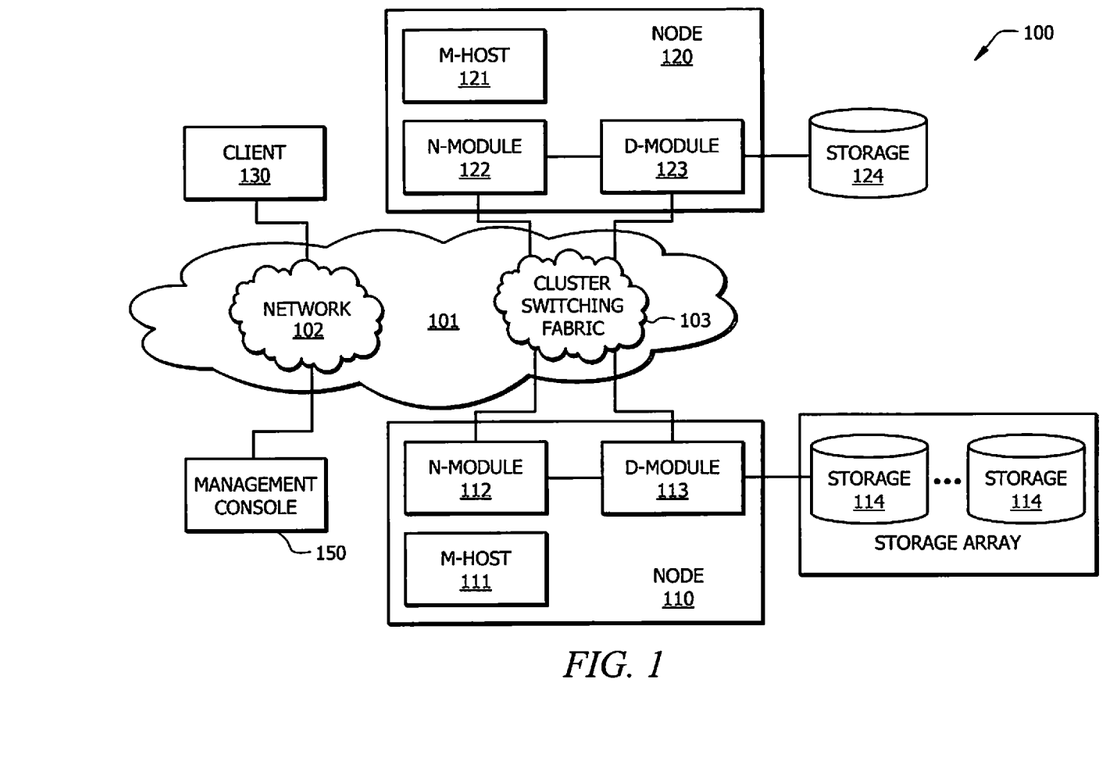
FIG. 1 illustrates a block diagram of storage system in accordance with an embodiment of the present disclosure.

FIG. 1 provides a block diagram of storage system 100 in accordance with an embodiment of the invention. System 100 includes a storage cluster having multiple nodes 110 and 120 which are adapted to communicate with each other and any additional nodes of the cluster. Nodes 110 and 120 are configured to provide access to data stored on a set of storage devices (shown as storage devices 114 and 124) constituting storage of system 100. Storage services may be provided by such nodes implementing various functional components that cooperate to provide a distributed storage system architecture of system 100. Additionally, one or more storage devices, such as storage array 114, may act as a central repository for storage system 100. It is appreciated that embodiments may have any number of edge nodes such as multiple nodes 110 and/or 120. Further, multiple storage arrays 114 may be provided at the multiple nodes 110 and/or 120 which provide resources for mirroring a primary storage data set.

Illustratively, nodes (e.g. network-connected devices 110 and 120) may be organized as one or more network elements (N-modules 112 and 122) and/or storage elements (D-modules 113 and 123) and a management element (M-host 111 and 121). N-modules may include functionality to enable nodes to connect to one or more clients (e.g. network-connected device 130) over computer network 101, while D-modules may connect to storage devices (e.g. as may implement a storage array). M-hosts may provide cluster communication services between nodes for generating information sharing operations and for presenting a distributed file system image for system 100. Functionality for enabling each node of a cluster to receive name and object data, receive data to be cached, and to communicate with any other node of the cluster may be provided by M-hosts adapted according to embodiments of the invention.

It should be appreciated that network 101 may comprise various forms, and even separate portions, of network infrastructure. For example, network-connected devices 110 and 120 may be interconnected by cluster switching fabric 103 while network-connected devices 110 and 120 may be interconnected to network-connected device 130 by a more general data network 102 (e.g. the Internet, a LAN, a WAN, etc.).

It should also be noted that while there is shown an equal number of N- and D-modules constituting illustrated embodiments of nodes, there may be a different number and/or type of functional components embodying nodes in accordance with various embodiments of the invention. For example, there may be multiple N-modules and/or D-modules interconnected in system 100 that do not reflect a one-to-one correspondence between the modules of network-connected devices 110 and 120. Accordingly, the description of network-connected devices 110 and 120 comprising one N- and one D-module should be taken as illustrative only and it will be understood that the novel technique is not limited to the illustrative embodiment discussed herein.

Network-connected device 130 may be a general-purpose computer configured to interact with network-connected devices 110 and 120 in accordance with a client/server model of information delivery. To that end, network-connected device 130 may request the services of network-connected devices 110 and 120 by submitting a read or write request to the cluster node comprising the network-connected device. In response to the request, the node may return the results of the requested services by exchanging information packets over network 101. Network-connected device 130 may submit access requests by issuing packets using application-layer access protocols, such as the Common Internet File System (CIFS) protocol, Network File System (NFS) protocol, Small Computer Systems Interface (SCSI) protocol encapsulated over TCP (iSCSI), SCSI encapsulated over Fibre Channel (FCP), and SCSI encapsulated over Fibre Channel over Ethernet (FCoE) for instance.

System 100 may further include a management console (shown here as management console 150) for providing management services for the overall cluster. Management console 150 may, for instance, communicate with network-connected devices 110 and 120 across network 101 to request operations to be performed at the cluster nodes comprised of the network-connected devices, and to request information (e.g. node configurations, operating metrics) from or provide information to the nodes. In addition, management console 150 may be configured to receive inputs from and provide outputs to a user of system 100 (e.g. storage administrator) thereby operating as a centralized management interface between the administrator and system 100. In the illustrative embodiment, management console 150 may be networked to network-connected devices 110-130, although other embodiments of the invention may implement management console 150 as a functional component of a node or any other processing system connected to or constituting system 100.

Management console 150 may also include processing capabilities and code which is configured to control system 100 in order to allow for management of tasks within network 100. For example, management console 150 may be utilized to configure/assign various nodes to function with specific clients, storage volumes, etc. Further, management console 150 may configure a plurality of nodes to function as a primary storage resource for one or more clients and a different plurality of nodes to function as secondary resources, e.g. as DR or HA storage resources, for the one or more clients.

In some embodiments, management console 150 may include processing resources which are configured to manage the obtaining of snapshots of one or more nodes (and the data stored in a storage device corresponding to the nodes) in a cluster without disturbing the functionality of one or more other nodes in a cluster. Such snapshots may be compiled under the control of management console in order to provide an eventually-consistent snapshot of each of the nodes. For example, in a system where node 110 and node 120 are cooperatively functioning in a clustered environment, management console 150 may monitor network traffic and/or take into consideration other factors such as potential traffic, parallel capabilities of other nodes, etc., in order to control obtaining a snapshot of node 110 without disturbing the functionality of node 120, and vice versa. Such actions allow client 130 to interact within storage network 100 without interruption while a snapshot of the nodes are being obtained. With this snapshot, management console 150 may function to provide the snapshot information to other network resources such as an off-site DR storage network (not shown).

It is noted that the processing capabilities and control discussed above with respect to management console 150 may also be distributed, entirely or in part, to processing resources on one or more nodes, or in some cases on a client device. Moreover, processing resources of the nodes may work in conjunction with management console 150 to provide eventually-consistent snapshots. For example, a node may monitor traffic and make a determination regarding when the node may be taken offline in order to provide an individual node-local snapshot. Such a snapshot may be taken in accordance with pre-determined conditions, e.g. based on timeframe, amount of data stored, amount of traffic present, information regarding peak/off peak times for node traffic, etc. Additionally, such monitoring and determination may be made in response to a control signal (e.g. from management console 150) requesting a snapshot.

In a distributed architecture, network-connected device 130 may submit an access request to a node for data stored at a remote node. As an example, an access request from network-connected device 130 may be sent to network-connected device 120 which may target a storage object (e.g. volume) on network-connected device 110 in storage 114. This access request may be directed through network-connected device 120 due to its proximity (e.g. it is closer to the edge than a device such as network-connected device 110 or ability to communicate more efficiently with device 130. To accelerate servicing of the access request and optimize cluster performance, network-connected device 120 may cache the requested volume in local memory or in storage 124. For instance, during initialization of network-connected device 120 as a cluster node, network-connected device 120 may request all or a portion of the volume from network-connected device 110 for storage at network-connected device 120 prior to an actual request by network-connected device 130 for such data.

As can be appreciated from the foregoing, in order to operate as a cluster (e.g. the aforementioned data storage system), network-connected devices 110-130 may communicate with each other. Such communication may include various forms of communication (e.g. point-to-point or unicast communication, multicast communication, etc.). Such communication may be implemented using one or more protocols such as CIFS protocol, NFS, iSCSI, FCP, FCoE, and the like. Accordingly, to effectively cooperate to provide desired operation as a logical entity, each node of a cluster is provided with the capability to communicate with any and all other nodes of the cluster according to embodiments of the invention.

Figure 2:
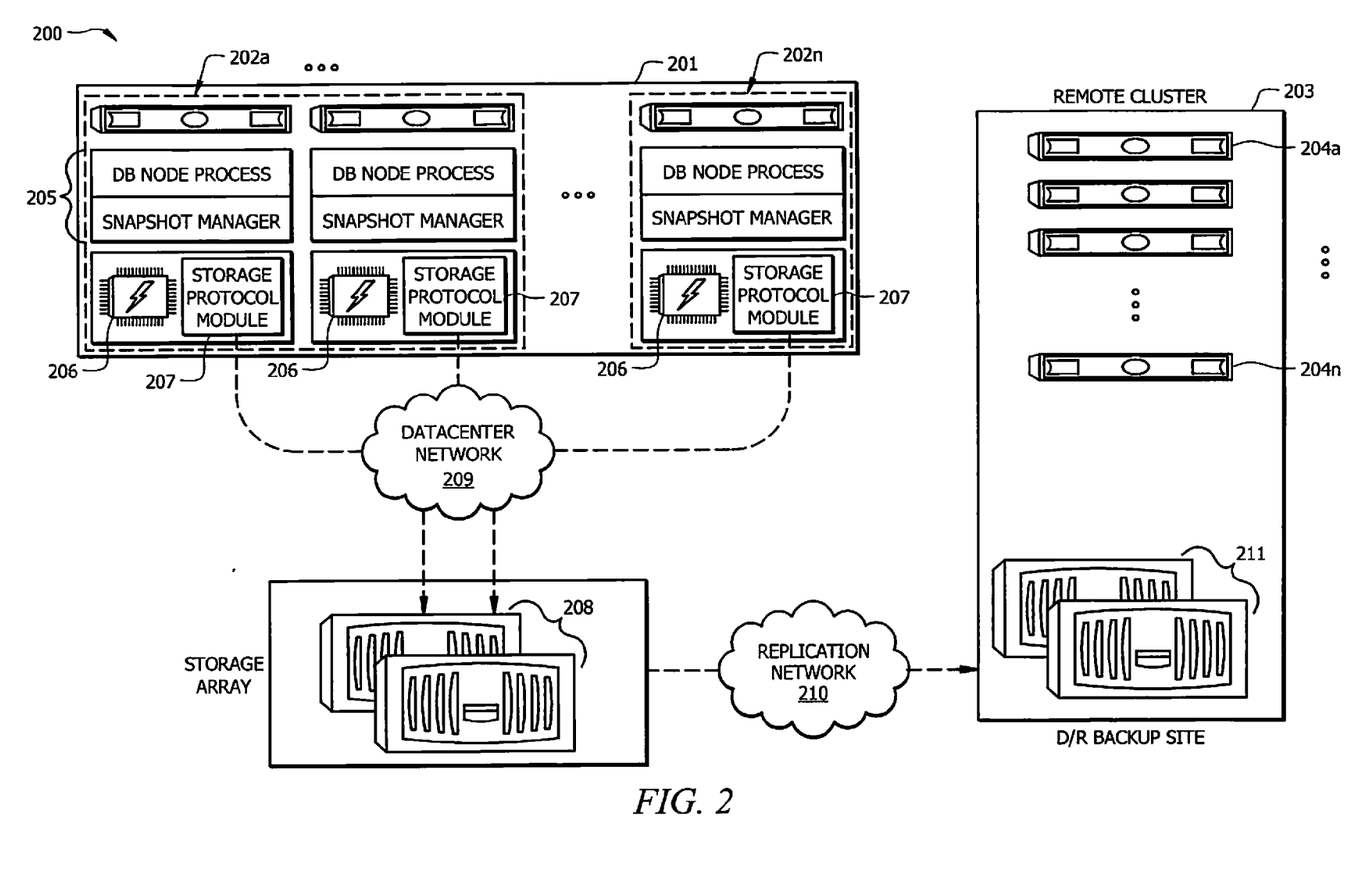
FIG. 2 illustrates a block diagram of storage system in accordance with an embodiment of the present disclosure.

FIG. 2 illustrates a block diagram of storage system 200 in accordance with an embodiment of the invention. System 200 includes a primary cluster 201 having a plurality of nodes 202a-n and a remote cluster 203 having a plurality of nodes 204a-n. Each node 202a-n is configured to run a software stack 205 which functions to implement the functionality of the nodes. For example, DB node process block may implement the database applications, e.g. for a NoSQL database, which assists with or determines where/when/how data is propagated in system 200. Stack 205 may include a snapshot manager which receives and/or provides instructions regarding how or when to take a snapshot at the node-local level. The snapshot manager of a particular node may operate independently. Alternatively, the snapshot manager of a node may coordinate with one or more other nodes and a management console (e.g. management console 150) to implement obtaining snapshots in an efficient manner which also minimizes impact on a client utilizing network 200.

Nodes 202a-n may also include local cache memory 206. Such cache memory may function to compile data written to a node and then eventually transmit that data to a more permanent storage device at a consistency point. Nodes 202a-n may further include input/output module 207 which provides bi-directional communication with one or more storage volumes 208 over data center network 209. Data center network 209 may include any type of communication network such as a LAN, WAN, and the like.

An example communication path for system 200 may comprise a client writing data for storage via node 202a. Such data may be stored in local cache memory 206 until a point in time where it is output through input/output 207 to a storage volume 208. Alternatively, data from a client may bypass local cache memory 206 and be stored directly to a volume assigned to node 202a. In one embodiment, when a snapshot for a particular node is desired, the snapshot manager of the node may cause the node to become unavailable while a snapshot of the storage volume corresponding to that node (and in some instances the local cache memory) is taken.

Snapshots of the individual nodes 202a-n may be taken and compiled into an eventually-consistent snapshot and provided over a replication network 210 to remote cluster 203 which includes its own nodes and storage volumes 211. In the illustrated embodiment, the replication is being provided to a DR backup site. As such, replication network has the capability to provide the replicated data to a remote facility (e.g. over a WAN).

In some embodiments, nodes 204a-n of remote cluster 203 may be established and mapped in a 1 to 1 relationship with nodes 202a-n. Such a mapping may provide for an efficient handover in the event that the remote cluster must act as a primary cluster for a client. Additionally, embodiments may utilize fewer or additional nodes at the remote site than are present at the primary site. Such mappings may be implemented internally in any manner which provides for efficiency of data communication within network 200 without causing poor performance to be apparent to a client device.

It is noted that the embodiment illustrated in FIG. 2 may distribute functionality differently depending on the particular type of network being implemented. For example, in a NoSQL database, nodes 202a-n may correspond to client devices (e.g. a cluster of storage blades in a network) which are in communication with a storage network. In such a case, the storage network (e.g. item 208 of FIG. 2) may include storage volumes, or may implement the entire storage system of FIG. 1 with nodes 202a-n being client device 130. In such a system, nodes 202a-n may provide information to the storage network which indicates when a snapshot of a volume corresponding to a particular node may be implemented as described above. In other words, the concept of obtaining individual snapshots of individual storage devices operating in a clustered environment to obtain an eventually consistent snapshot of a cluster may be applicable regardless of where or how the cluster is implemented. Such modifications will be apparent to a person of ordinary skill in the art reading the present application.

Accordingly, one or more elements of FIG. 2 may be implemented with the elements described with respect to FIG. 1. For example, nodes 202a-n may be implemented as one or more of nodes 110 and 120 or client 130. Network 209 may function as described with respect to communication network 100. Additionally, storage array 208 may be implemented with one or more storage resources such as nodes 110 and 120 and storage devices 114 and 124.

Figure 3:
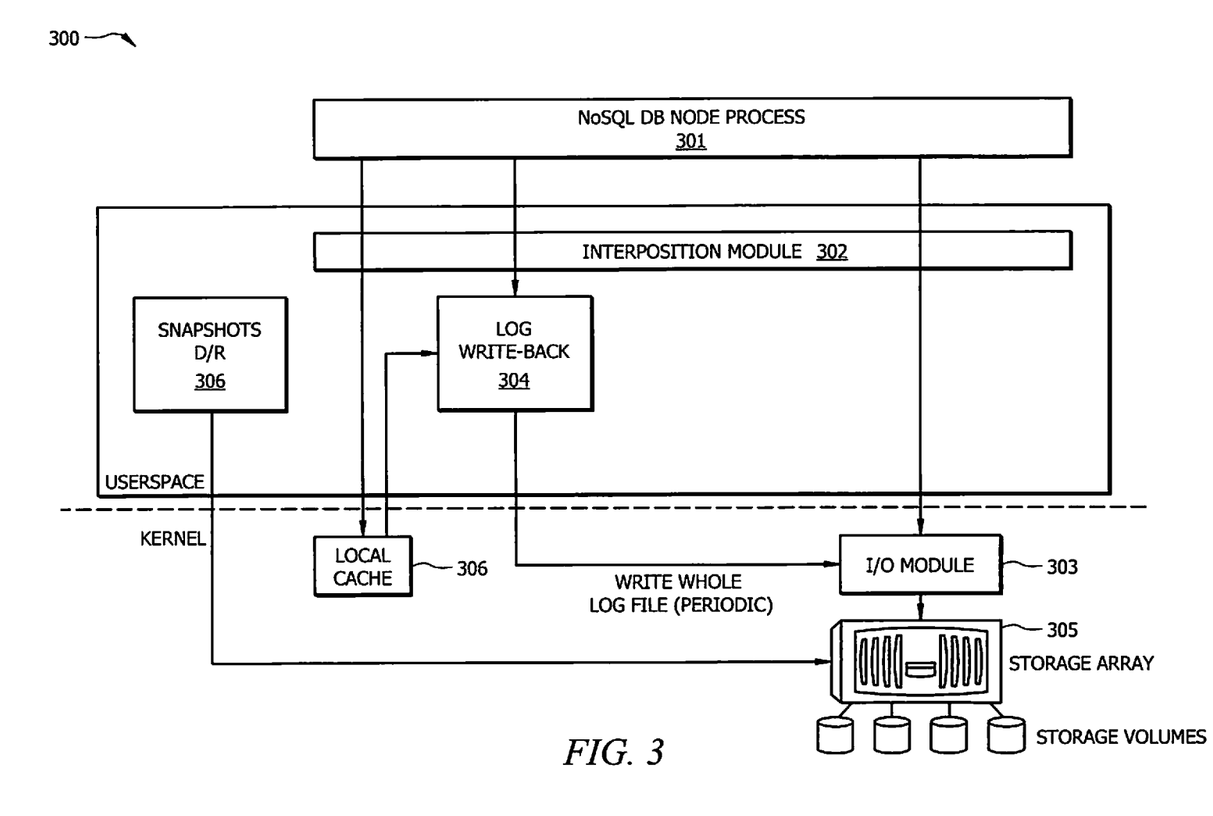
FIG. 3 illustrates a block diagram of storage system in accordance with an embodiment of the present disclosure.

FIG. 3 illustrates a block diagram for the functioning of a node 300 in accordance with an embodiment of the present application. Node 300 may be implemented as network connected devices 110, 120, 130 or node 202 as described above. Node 300 includes a NoSQL node process block 301 which includes instructions for the configuration/implementation of node 300. Such instructions may govern the configuration of the node, the timing and data flow within the node, etc. Node 300 includes interposition module 302 which functions to intercept new writes or I/O operations that are intended to write data to storage. The intercepted data may then be written to local cache 306 or may be provided to an I/O module 303. When written to local cache, periodically log write-back block 304 may cause the data in local cache 302 to be provided to I/O module 303 where the data is then sent to storage array 305.

Node 300 also includes a snapshot DR block 306 which functions to coordinate when snapshots of a volume corresponding to node 300 may be implemented. Such coordination may be made in response to various conditions observed within node 300 or within a larger storage network. As described above, a node may receive commands from external management processing devices regarding when to take a snapshot and/or the node may monitor and control a portion or all of such functionality. In other words, snapshot DR block 406 may utilize any information within the node. For example, information from log write back block 304 may be utilized to determine whether it is a good time to take a snapshot of a storage volume corresponding to node 300 as it may provide information regarding whether the relevant storage volume includes up-to-date information. Accordingly, snapshot DR block 306 may determine or assist in determining when a good time for obtaining a snapshot is present and it may do so independently of other nodes (e.g. without coordination or requiring quiescing of other nodes).

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
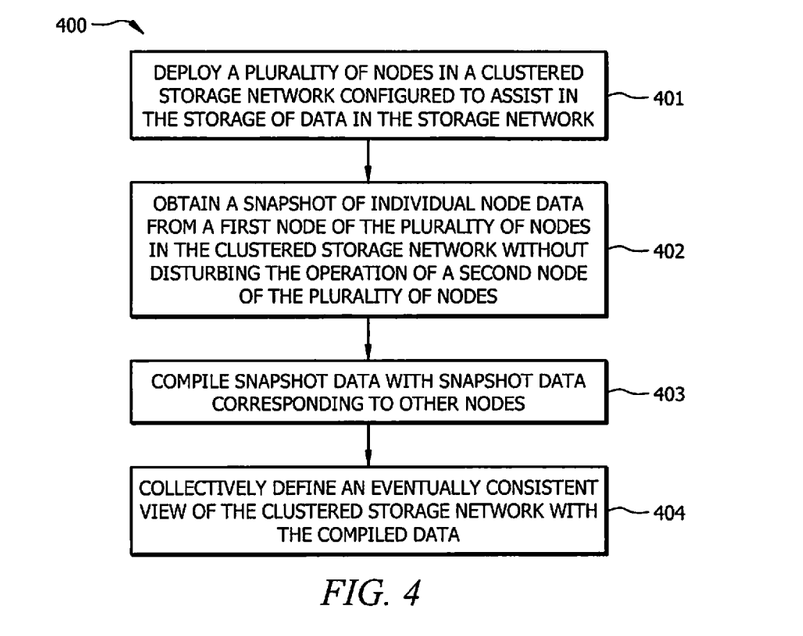
FIG. 4 illustrates a method for storing data in accordance with an embodiment of the present disclosure.

FIG. 4 illustrates a method 400 for managing communications in a storage network in accordance with an embodiment of the present application. It is noted that embodiments of method 400 may be implemented within the storage networks described above with respect to FIGS. 1-3. Specifically, method 400 may include, at block 401, deploying a plurality of nodes in a clustered storage network which are configured to assist in the storage of data in the storage network. Method 400 may further include, at block 402 obtaining a snapshot of individual node data from a first node of the plurality of nodes in the clustered storage network without disturbing the operation of a second node of the plurality of nodes. This snapshot may be obtained under the control of one or more processing devices located within devices of a storage network, e.g. a management console, within a node, etc.

Additionally, at block 403, method 400 may include collecting snapshot data with other snapshot data corresponding to other nodes and at block 404, collectively defining an eventually consistent view of the clustered storage network with the compiled data. The other snapshot data may originate from other nodes and be obtained in the same manner (e.g. without disturbing the operation of the other nodes). Further, as discussed above, the timing for obtaining snapshot data may take into account various factors such as the amount or expected traffic on a particular node, the availability of other nodes, and the like. Moreover, the determination as to when a snapshot may be obtained may be made locally at the node, by an external processing device, and/or a combination of both. With the snapshots, the compiled data may be provided to a remote storage network, e.g., to implement DR functionality.

Figure 5:
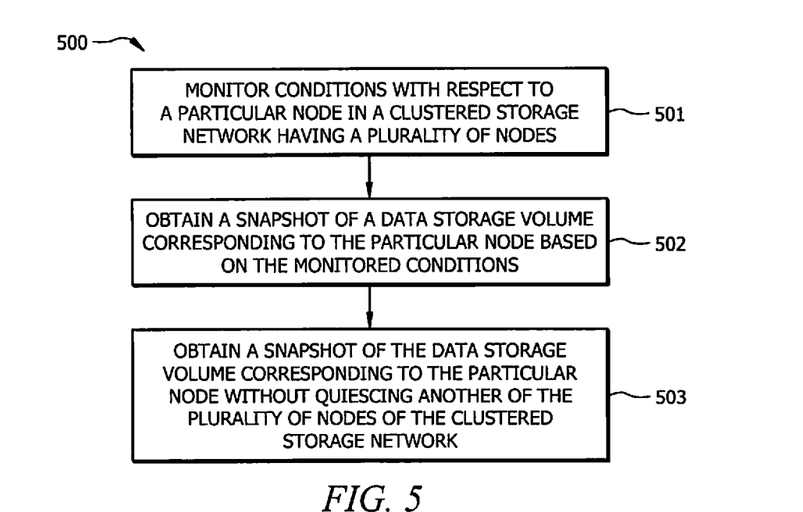
FIG. 5 illustrates a method for managing communications in a storage network in accordance with an embodiment of the present application.

FIG. 5 illustrates a method 500 for managing communications in a storage network in accordance with an embodiment of the present application. It is noted that embodiments of method 500 may be implemented within the storage networks described above with respect to FIGS. 1-3. Specifically, method 500 may include, at block 501, monitoring conditions with respect to a particular node in a clustered storage network having a plurality of nodes. Monitoring conditions may include reviewing any information relevant to the use of the node and more particularly relating to whether a snapshot of a node may be needed, whether the node may be temporarily taken offline in order to obtain a snapshot, etc. It is noted that monitoring may be implemented at the node level, by external processing resources, and/or a combination of each.

Method 500 may include, at block 502, determining to obtain a snapshot of a data storage volume corresponding to the particular node based on the monitored conditions. Such a determination may be made at the node-local level, and/or at an external processing device. Further, method 500 may include, at block 503, obtaining a snapshot of the data storage volume corresponding to the particular node without quiescing another of the plurality of nodes of the clustered storage network. In this manner, a snapshot of a node in a clustered network may be taken without requiring one or more of the other nodes of the cluster to be taken offline. Snapshots of each node of the cluster may then be combined to form an eventually consistent view of the cluster.

Those of skill would further appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It is also appreciated that the systems and method described herein are able to be scaled for larger storage network systems. For example, a cluster may include hundreds of nodes, multiple virtual servers which service multiple clients and the like. Such modifications may function according to the principles described herein.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
    deploying a plurality of nodes in a clustered storage network, said plurality of nodes configured to store data in the clustered storage network, where each node is an independent physical device that uses an individual logical storage volume to store data at the clustered storage network;
    obtaining, by at least one processing device, a first snapshot of all individual node data corresponding to a data storage volume of a first node of the plurality of nodes in the clustered storage network without disturbing the operation of any other node of the plurality of nodes; wherein the first snapshot includes snapshot of any data stored at a local caching device of the first node that has not been transferred to storage remote to the first node;
    collecting, by the at least one processing device, the first snapshot with snapshot data corresponding to individual data corresponding to individual logical storage volumes of each of the plurality of nodes; and
    collectively defining an eventually consistent view of the clustered storage network with the collected data, wherein the eventually consistent view of the clustered storage network is defined when a snapshot of each node of the plurality of nodes including the first snapshot has been collected to provide an overall snapshot of the plurality of nodes.

2. The method of claim 1 further comprising obtaining snapshots of the individual nodes one at a time.

3. The method of claim 1 further comprising obtaining snapshots of the individual nodes two or more at a time asynchronously.

4. The method of claim 1 wherein obtaining snapshots of individual node data is determined at a node-local level.

5. The method of claim 1 wherein obtaining snapshots of individual node data is controlled externally from a node by a management console configured to monitor data flow of the storage network.

6. The method of claim 5 wherein monitored data flow comprises monitoring one or more of:
    available bandwidth traffic of the storage network;
    historical traffic data of the storage network; and
    current traffic data of the storage network.

7. The method of claim 1 further comprising obtaining a snapshot when the storage network conditions meet a predetermined threshold.

8. The method of claim 1 further comprising each snapshot being transferred to one or more volumes on a storage cluster and then subsequently provided to a disaster recovery backup site.

9. The method of claim 8 further comprising recovering one or more nodes in the storage network using the eventually consistent state.

10. The method of claim 8 wherein the disaster recovery backup site provides for replication of data without utilizing the same number of nodes of said plurality of nodes.

11. A method comprising:
    monitoring, by a processing device, conditions with respect to a particular node in a clustered storage network having a plurality of nodes, the conditions including traffic conditions for the particular node, where each node is an independent physical device that uses an individual logical storage volume to store data at the clustered storage network;
    determining, by a processing device, to obtain a snapshot of a data storage volume corresponding to the particular node based on the monitored conditions;
    obtaining a snapshot of the data storage volume corresponding to the particular node without quiescing any other of the plurality of nodes of the clustered storage network; wherein the snapshot includes snapshot of any data stored at a local caching device of the first node that has not been transferred to storage remote to the particular node; and
    generating an eventually consistent view of the clustered storage network, where the eventually consistent view of the clustered storage network is defined when a snapshot of each node of the plurality of nodes including the snapshot for the particular node has been collected to provide an overall snapshot of the plurality of nodes.

12. The method of claim 11 wherein said monitoring is implemented by a processing device on the particular node.

13. The method of claim 11 wherein said monitoring is implemented by a management processing device.

14. The method of claim 11 further comprising obtaining a snapshot of a plurality of nodes in the clustered storage network without quiescing each other node of the clustered storage network.

15. A storage system comprising:
    a cluster having a plurality of nodes, said plurality of nodes configured to assist in the storage of data in the storage network, where each node is an independent physical device that uses an individual logical storage volume to store data at the clustered storage network;
    at least one processing device configured to obtain a first snapshot of all individual node data corresponding to a data storage volume of a first node of the plurality of nodes in the cluster without disturbing the operation of any other node of the plurality of nodes; wherein the first snapshot includes snapshot of any data stored at a local caching device of the first node that has not been transferred to storage remote to the first node; and
    at least one processing device configured to compile the first snapshot with snapshot data corresponding to individual data of each of the plurality of nodes and to collectively define an eventually consistent view of the cluster with the compiled data, wherein the eventually consistent view of the clustered storage network is defined when a snapshot of each node of the plurality of nodes including the first snapshot has been collected to provide an overall snapshot of the plurality of nodes.

16. The storage system of claim 15 wherein the at least one processing device is configured to obtain snapshots of the individual nodes two or more at a time without quiescing each node in the cluster.

17. The storage system of claim 15 further comprising at least one processing device configured to monitor data corresponding to at least one node of the cluster, wherein said data includes one or more of:
  available bandwidth traffic of the storage network;
  historical traffic data of the storage network; and
  current traffic data of the storage network.

18. The storage system of claim 17 further comprising at least one processing device configured provide the eventually consistent view of the cluster to a disaster recovery network location.

19. A computer program product, comprising:
  a non-transitory computer-readable medium comprising code for causing a computer to:
    monitor conditions with respect to a particular node in a clustered storage network having a plurality of nodes, the conditions including traffic conditions for the particular node, where each node is an independent physical device that uses an individual logical storage volume to store data at the clustered storage network;
    determine to obtain a snapshot of a data storage volume corresponding to the particular node based on the monitored conditions;
    obtain a snapshot of the data storage volume corresponding to the particular node without quiescing any other of the plurality of nodes of the clustered storage network; wherein the snapshot includes snapshot of any data stored at a local caching device of the first node that has not been transferred to storage remote to the particular node; and
    generate an eventually consistent view of the clustered storage network, wherein the eventually consistent view of the clustered storage network is defined when a snapshot of each node of the plurality of nodes including the snapshot of the particular node has been collected to provide an overall snapshot of the plurality of nodes.

20. The computer program product of claim 19 wherein said monitoring is implemented by a processing device on the particular node.

21. The computer program product of claim 19 wherein said monitoring is implemented by a management processing device.

22. The computer program product of claim 19 wherein the code further causes the computer to obtain a snapshot of each of a plurality of nodes in the clustered storage network without quiescing each other node of the clustered storage network.

* * * * *